Figure 1:
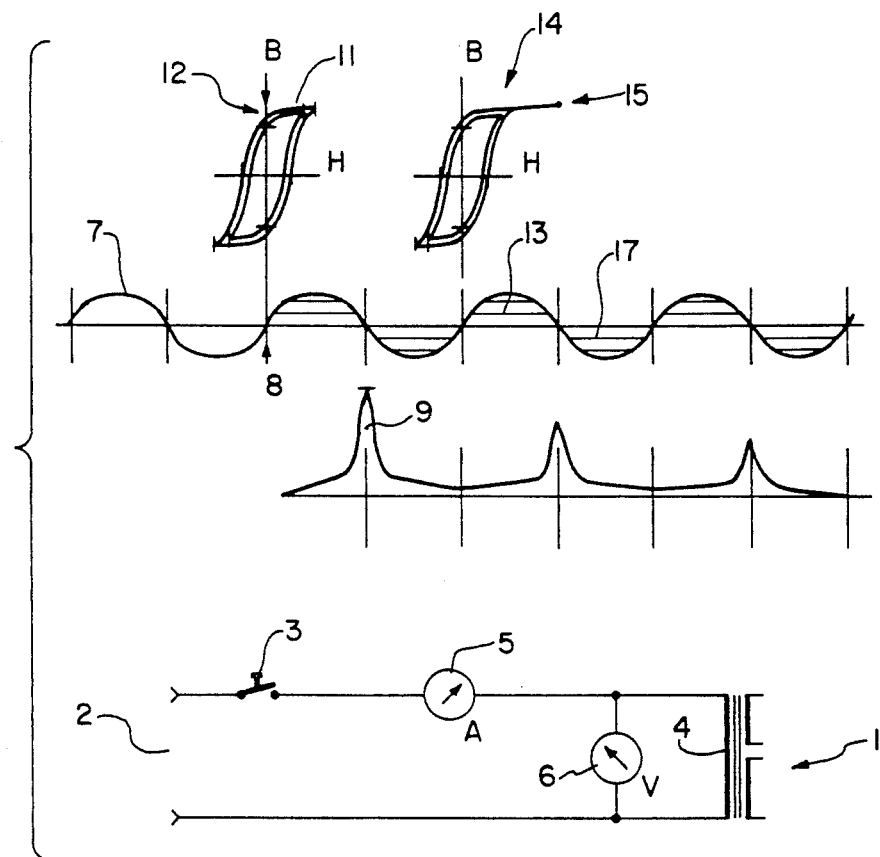

United States Patent [19]

Kontanzer

[11] Patent Number: 5,216,567
[45] Date of Patent: Jun. 1, 1993

[54] DEVICE FOR THE ALTERNATING CURRENT CUT-IN LIMITATION

[75] Inventor: Michael Kontanzer, Freiburg, Fed. Rep. of Germany

[73] Assignee: Fraunhofer-Gesellschaft zur Forderung der Angewandten Forschung E.V., Munich, Fed. Rep. of Germany

[21] Appl. No.: 761,811
[22] PCT Filed: Apr. 6, 1990
[86] PCT No.: PCT/DE90/00272
§ 371 Date: Sep. 20, 1991
§ 102(e) Date: Sep. 20, 1991
[87] PCT Pub. No.: WO90/12439
PCT Pub. Date: Oct. 18, 1990

[30] Foreign Application Priority Data

Apr. 11, 1989 [DE] Fed. Rep. of Germany ....... 3911742

[51] Int. Cl.⁵ .............................................. H02H 9/00
[52] U.S. Cl. ........................................ 361/3; 361/154; 323/908
[58] Field of Search ................. 361/3, 4, 58, 152, 154; 323/908

[56] References Cited

U.S. PATENT DOCUMENTS 3,925,688 12/1975 Kalfus ................................ 307/252
4,131,927 12/1978 Tsuchiya et al. ........................ 361/6

FOREIGN PATENT DOCUMENTS 0222727 5/1987 European Pat. Off. .
1591680 1/1971 Fed. Rep. of Germany .
2424716 12/1975 Fed. Rep. of Germany .
2530047 1/1977 Fed. Rep. of Germany .
2735736 3/1979 Fed. Rep. of Germany .
2746845 4/1979 Fed. Rep. of Germany .

OTHER PUBLICATIONS

ELV Journal 45 Article, pp. 1-4, Jun. 1987.

Primary Examiner—Todd E. DeBoer
Attorney, Agent, or Firm—Baker & Daniels

[57] ABSTRACT

The invention concerns a device for a.c. cut-in limitation of a power-supply unit with inductive reactance. The device has a series-connected first a.c. switch and a phase-angle control circuit by means of which a time lag can be introduced in the connection between the primary winding and the mains a.c. voltage at the point in time that cut-in takes place. The control electrode of the first a.c. switch of the floating phase-angle control circuit is connected to the output of a control circuit by means of which a trigger voltage, which is synchronized with the mains a.c. voltage, is generated, when the power-supply unit is switched in, at a selectable phase angle between 90 and 0 degrees before a zero passage of the main a.c. voltage. The trigger voltage can be suppressed before the zero passage of the mains a.c. voltage is reached in order to switch off the power-supply unit. A capacitor connected in parallel with the power-supply unit enables the residual magnetism to be set before or after each switching in or out of the unit so that the power-supply unit can always and under any condition be switched in without the peak cut-in exceeding the load current.

20 Claims, 5 Drawing Sheets

DEVICE FOR THE ALTERNATING CURRENT CUT-IN LIMITATION

The invention concerns a device for the alternating current cut-in limitation of an reactive power supply unit that is wired in series with a first alternating current switch and features a phase control circuit through which the connection of the primary winding with the mains alternating voltage can be retarded from the cut-in moment forward, wherein a control electrode of the first alternating current switch of the supply voltage-buffered phase control circuit is connected with the output of a control circuit by which at the cut-in of the power supply unit at a preselectable phase angle of the mains alternating voltage a firing voltage synchronized with the latter can be generated, which for the shutoff of the power supply unit can be suppressed in due time before reaching a zero pass of the alternating current voltage.

Such a device for the alternating cut-in limitation is known from DE 27 35 736 A1, with which switching interferences during a clock switching operation can be avoided in that a one-sidedly directed premagnetization of the ferromagnetic material of the load is eliminated. But with this device it is not possible to quickly reconnect an reactive power supply unit after a mains voltage failure, since such voltage failure leaves an uncontrolled remanence behind.

DE 25 39 047 A1 teaches a device for the shutoff of transformers where immediately before the cut-in of a transformer a remanence premagnetization can be generated, by a direct current, against the magnetization given by the cut-in process. This direct current can be generated by a defined surge from a capacitor battery and superimposes the first half cycle of the alternating voltage.

EP 0 222 727 A1 describes a device for the minimization of mains repercussions on inductive elements in a high-voltage network, where cut-in moments of the reactive power supply unit other than those at the voltage maximum or current zero pass are selected, with alternating current switches in the form of triacs being used.

A further device for the alternating current cut-in limitation is known from ELV Journal 45, pages 1 through 4. On transformers with an iron core, specifically annular core transformers, which are connected to a 220-volt alternating current service, the cut-in or start-up current, also called inrush, at the cut-in moment is by a multiple greater than the nominal current. This leads frequently to the blowing of the equipment fuse provided, without apparent reason, and to disturbances of equipment in the neighborhood. Besides, the cut-in current peaks require an overdimensioning of some components or even of the transformer itself, leading to higher costs and/or greater construction volumes.

A similar circuit setup for limitation of the cut-in current surge is known from the German patent disclosure 1,591,680, where a triac is provided parallel to a series resistor in the primary circuit of a transformer. A shunt prevents a high flow of current at the cut-in, and the triac fires only after a waiting time of 0.1 to 0.2 seconds, through a capacitor which in the meantime has been charged. This device fails to determine the remanence direction of the transformer that was impressed by the cut-out. The device, furthermore, has the disadvantage that in the case of frequent cut-in and cut-out the magnetic remanence of the transformer, through the current flowing at the beginning, will in the passive state ever more shift into saturation, so that the cut-in peak current which builds up due to successive zero passes will not ebb off. In the process, also the shunt heats up increasingly.

Known from the German patent document 27 46 845 is a further device for the alternating current cut-in limitation where, at continuous phase control, during a start time the conductive angles of the voltage slowly shift from small values toward large ones. Along with it there occur during the cut-in process cut-in current peaks which far exceed the nominal current, because the remanence polarity and voltage polarity are not being allowed for in the cut-in.

From the German patent disclosure 24 24 716, lastly, there is a setup for suppression of the cut-in current surge on transformers known, where at the assembly of the transformer there are Hall probes at at least one, preferably several points installed in the transformer core, for continually measuring the remanence flow. The cut-in device is turned on at the moment when the momentary value of the above sum flow composed of exciter flow and remanence flow ranges around zero. This arrangement has the disadvantage that it is applicable only on large transformers, for instance on transformers installed on locomotives, specifically for cost reasons; and that this setup must be provided and installed at the time when the transformer is assembled. A retroactive installation in existing systems is not possible.

Basing on this prior art, the problem underlying the invention is to provide a device of the initially named type which without any design intervention of a power supply unit allows making the full power available, without noticeable retardation, after the cut-in of the power supply, and to nonetheless safely suppress interfering cut-in current peaks.

This problem is inventionally solved in that a capacity is provided parallel to the reactive power supply unit, wherein the capacity is arranged in series with a parallel circuit of a second alternating current switch and a series arrangement of a charging resistor and a rectifier, in that the second alternating current switch can be fired several milliseconds after a cut-out or failure of the mains alternating voltage, by a mains-off recognition circuit, so that the capacity sets the remanence of the power supply unit after the cut-out in a defined way, in that the power supply unit can be cut in at a preselectable phase angle between 90 and 0 degrees before a zero pass of the mains alternating voltage, and in that the firing voltage of the first alternating current switch can for the shutoff of the power supply unit, at a like type zero pass, be suppressed in due time before reaching said zero pass.

With a capacity wired parallel to the reactive power supply unit, the magnetic remanence of the power supply unit after its shutoff or failure can be set in a defined way. The capacity is wired in series with a second alternating current switch with which a charging resistor and a direct current diode are wired parallel. This second alternating switch is fired several milliseconds after the intended or incidental shutoff of the mains alternating voltage, by a mains-off recognition circuit, so that by the flow of the charge stored in the capacity there is the remanence of the power supply unit generated in the transformer.

The capacity is wired parallel with the power supply unit via the rectifier diode and the charging resistor, so that it will be charged during the operating times of the unit. The time constant of the time section formed of the capacity and the charging resistor amounts preferably to less than 1.5 times the period duration of the mains alternating voltage. Wired parallel to the power supply unit, the capacity allows a defined setting of the remanence of the transformer prior to each cut-in, so that the power supply unit can be turned on always and at all conditions without any cut-in current peak that exceeds the load current.

The device according to the invention can be used also with a triphase power supply, wherein a third current switch is connected between one of the said two terminals of the power supply unit and a further terminal of it. The control electrode of this third alternating current switch is connected as well with the output of the phase control circuit.

Further favorable embodiments of the invention are characterized in the subclaims.

Embodiments of the invention will be more fully explained hereafter in exemplary fashion with the aid of the drawings.

Figure 3:
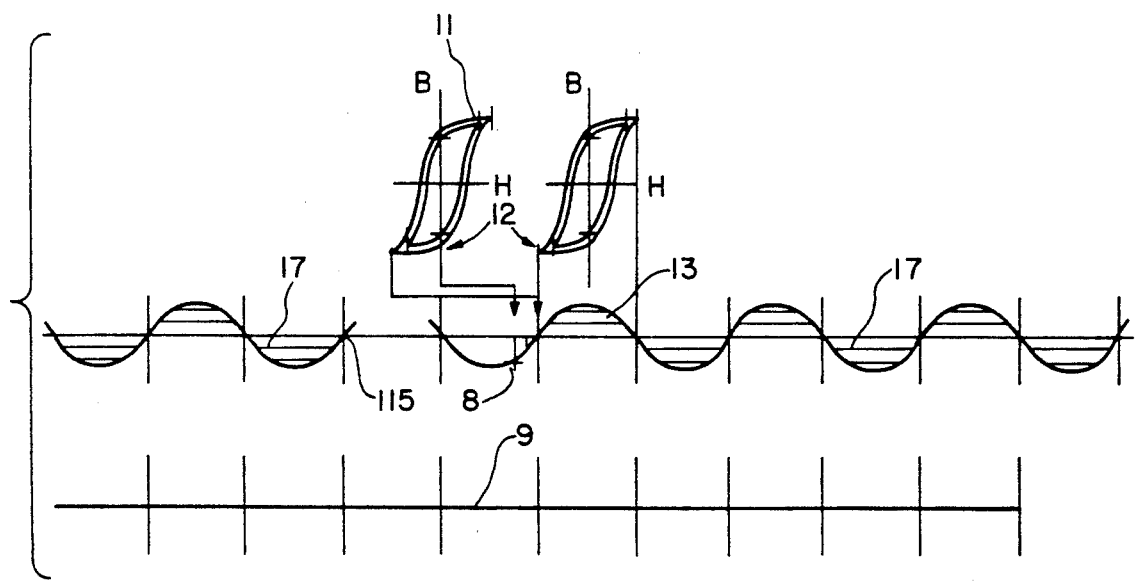
Figure 2:
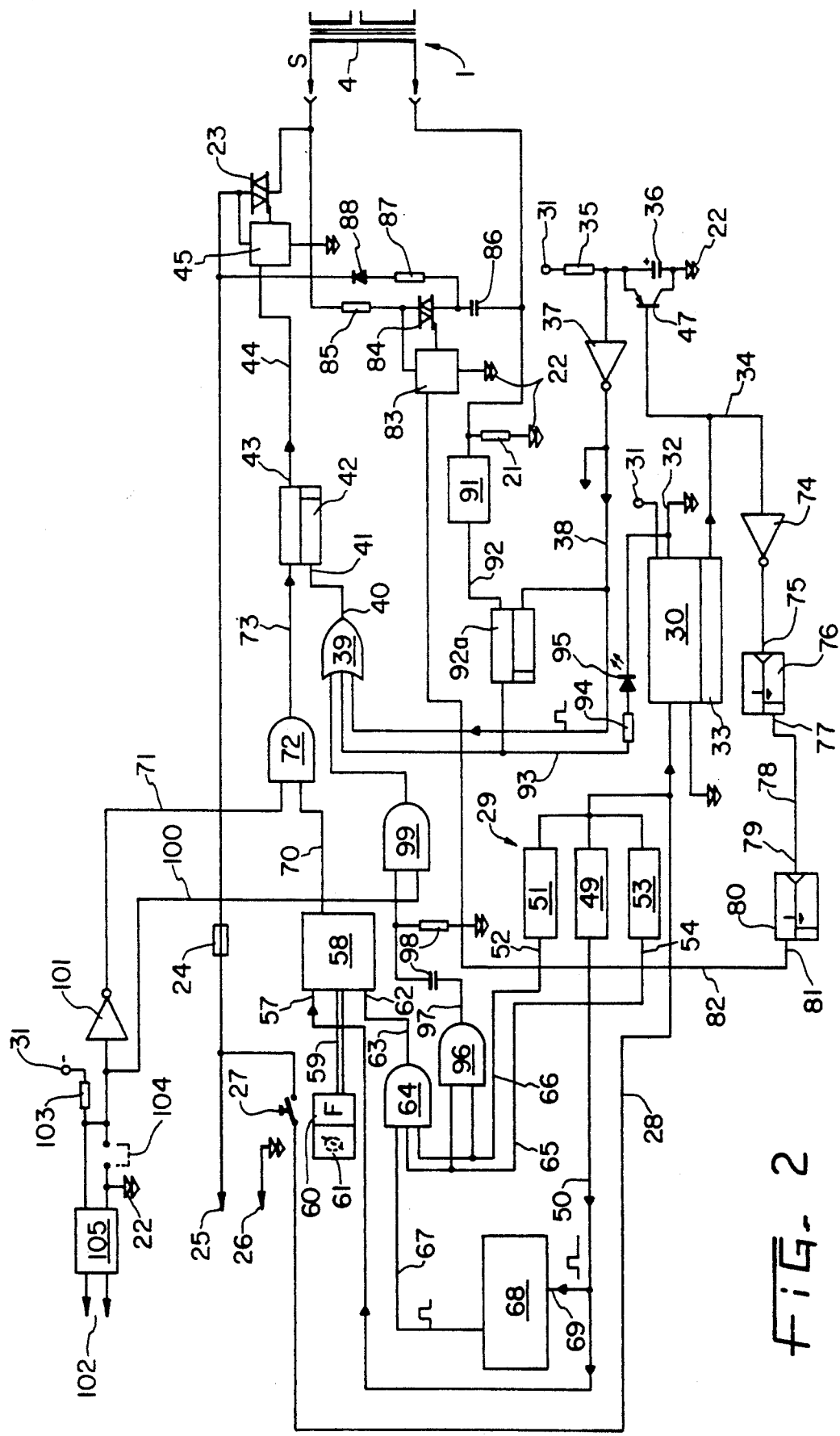
Figure 4:
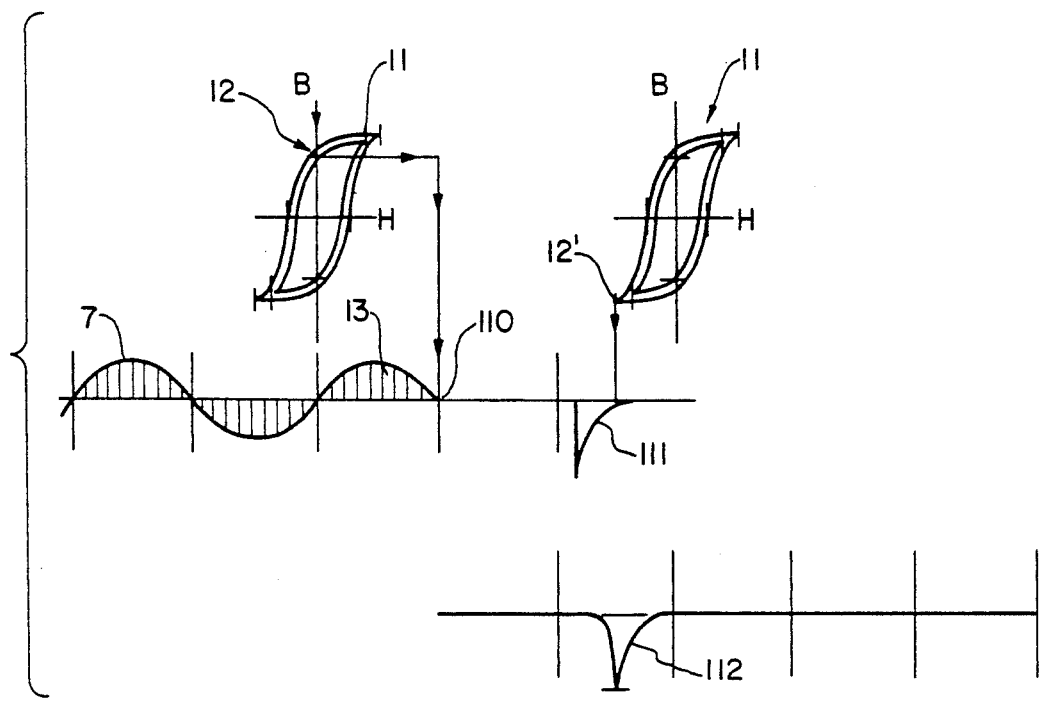
Figure 5:
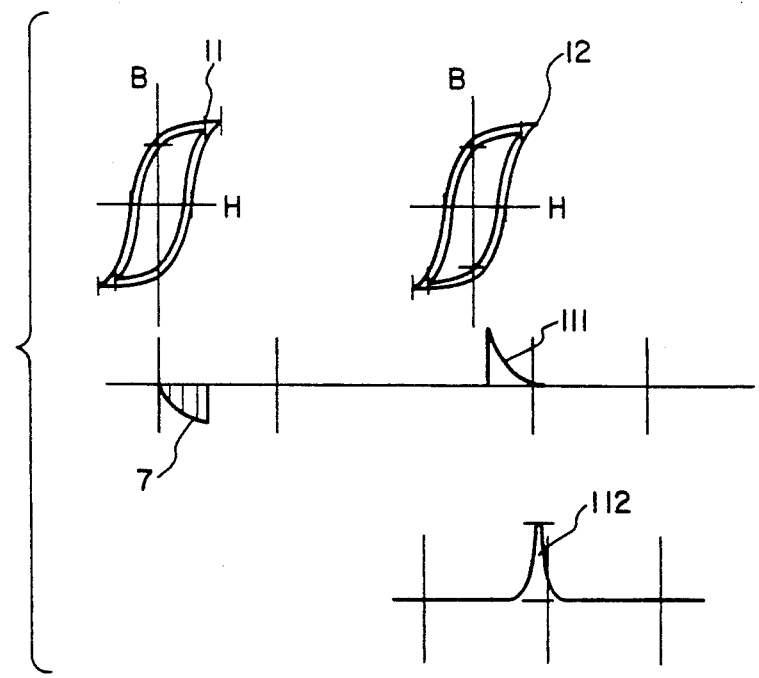
Figure 6:
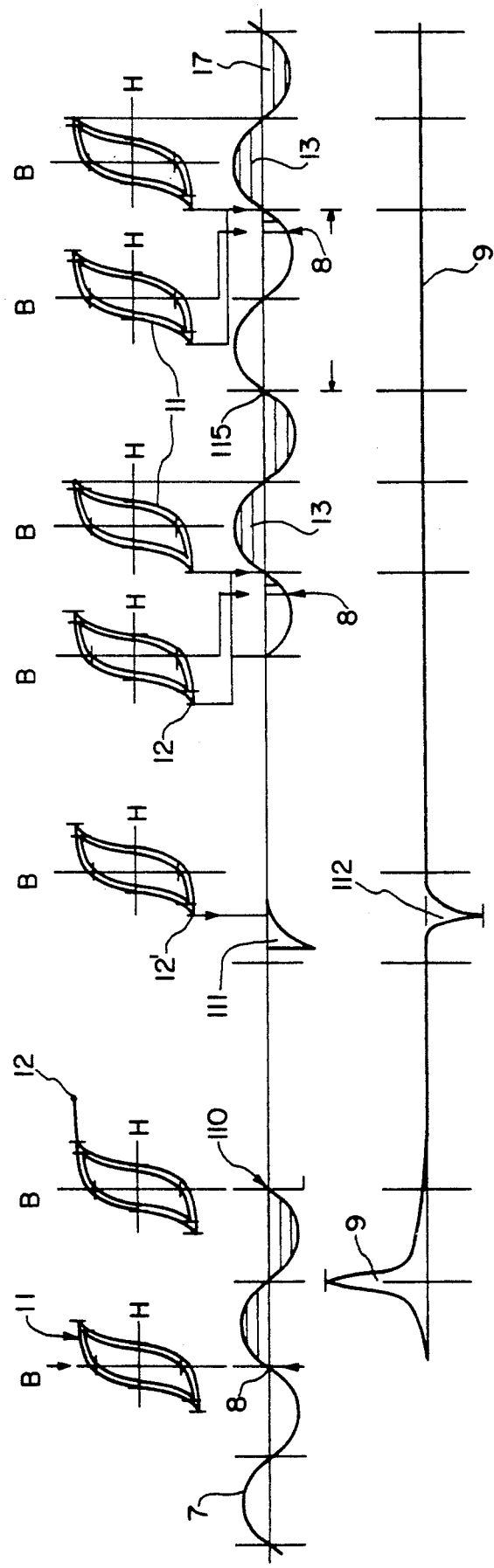
Figure 7:
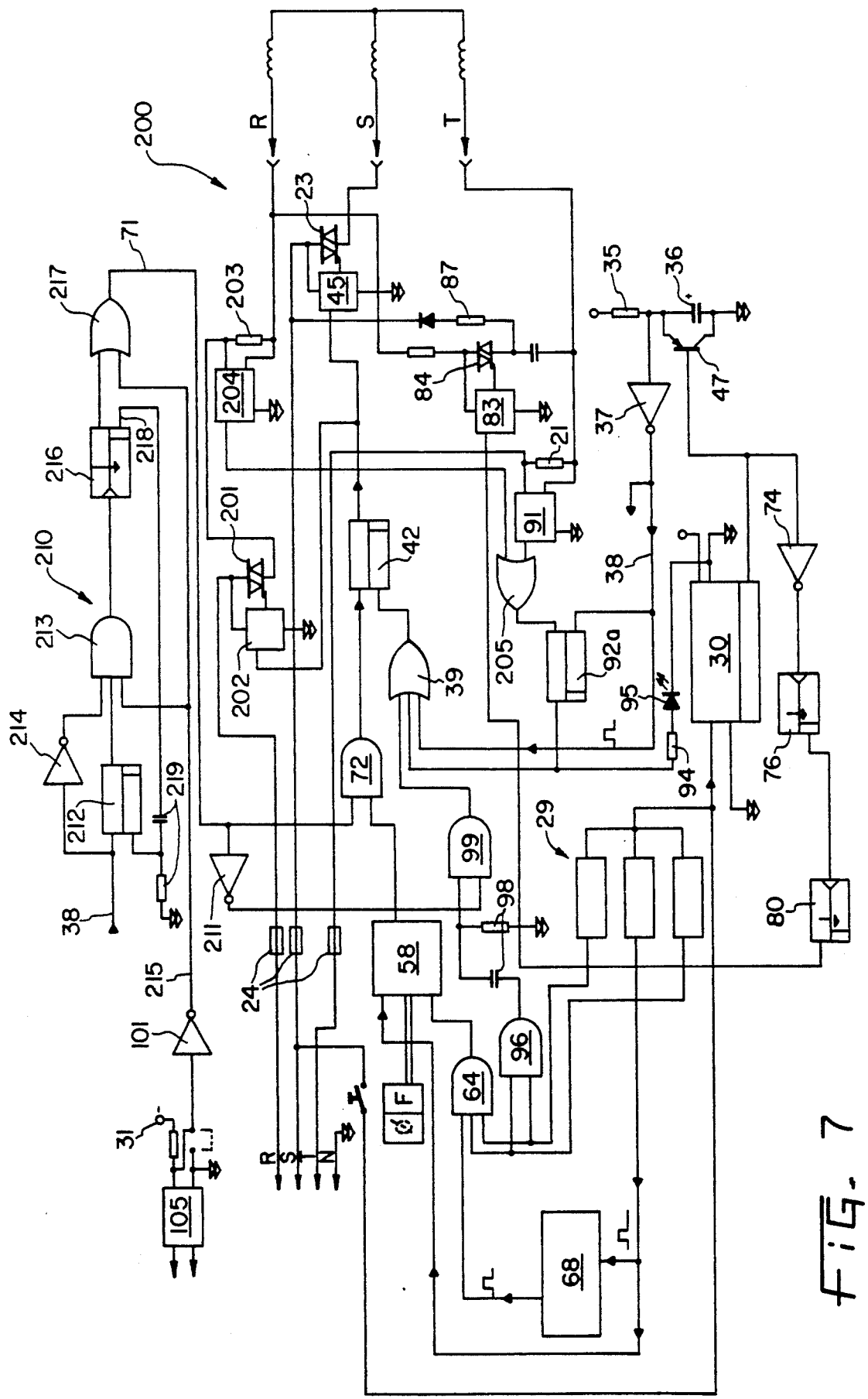

FIG. 1 shows signal curves of the mains voltage and the mains current as a transformer is turned on in idling;

FIG. 2, a block diagram of a device for limitation of cut-in current peaks in a primary winding of a transformer;

FIG. 3, patterns of voltage signals and current signals in cut-in processes on transformers in idling;

FIG. 4, a cut-in process of the transformer in idling;

FIG. 5, the setting of the magnetic remanence of a mains voltage 7 shut off arbitrarily or incidentally;

FIG. 6, signal patterns at the first-time operation of the transformer with subsequent pulse operation; and FIG. 7, a device for the cut-in current limitation in the use of a triphase power supply.

FIG. 1 shows the signal curve of the mains voltage and of the mains current as a transformer 1 cuts in the idling. Representing a possible power supply, a transformer 1 is connected to a mains voltage 2. The voltage can be switched to the primary winding 4 of the transformer 1 using a switch 3, with the current flowing in the primary circuit being determined by an ammeter 5 and the voltage on the primary side 4 of the transformer 1 by a voltmeter 6.

FIG. 1 represents the voltage pattern of the mains voltage in the primary circuit, with the main switch 3 being closed at the point in time 8. The curve 9 shows the subsequent value pattern of the current flow on the primary side 4 of the transformer 1, during its idling.

In the case illustrated in the drawing there exists a specific magnetic remanence of the transformer 1, which in the hysteresis curve 11 of the transformer 1 is illustrated by a dot 12. The hysteresis curve 11 shows the dependence of the field strength H in the iron upon the induction density B. The remanence 12 of the transformer 1 is positive in the case illustrated in FIG. 1. The main switch 3 is turned on the most unfavorable case, namely at the moment 8 at a zero pass with a positive gradient, that is, into a positive half cycle 13. This drives the transformer in the induction density/field strength diagram 14 into the positive saturation 15, resulting in high inrush currents 9, which, e.g., in the case of a 400-VA transformer may assume a magnitude up to 150 amperes. These currents diminish at subsequent like type zero passes, unless a fuse of the circuit responds, with a dropping exponential function. The same situation with a corresponding negative inrush current would occur when turing the transformer on at a negative remanence and in the zero pass into a negative cut-in half cycle 17.

In FIG. 1 and in the drawings described hereafter, hatched half cycles 13 and 17 signify that these points in time the switch 3 or corresponding main switches supply voltage to the primary side of the transformer 1. The half cycles drawn without hatching illustrate the phase pattern of the continuing mains alternating voltage, without this voltage being passed to the power supply unit. The illustrated case occurs when the transformer 1 is turned off toward the end of a mains voltage half cycle, causing a heavy remanent polarization of the transformer iron. The polarity of the remanence depends in that case on the polarity of the last mains half cycle 13 or 17 prior to cut-out.

The unfavorable cut-in process illustrated in FIG. 1 occurs especially with semiconductor relays, since these always cut in at the beginning of a mains half cycle and cut out at the end of a main half cycle, with the probability that the cut-in and cut-out will take place with half cycles of same polarity being just 50%. However, semiconductor relays generally display advantages in the switching of loads, for instance of transformers, so that these are being used ever more frequently. The device described hereafter, which is permanently installed in the unit between the mains input 2 and the transformer 1, reduces such inrush current peaks in an impressive way.

FIG. 2 shows a block diagram of a device for limitation of cut-in current peaks in the primary winding 4 of a transformer 1. Connected to a load on the secondary side, the transformer 1 features a primary winding 4 which with its one end is connected with the circuit ground 22 via measuring shunt 21. The other tap of the primary side of the transformer 1 connects via a first triac 23 and a load fuse 24 of, e.g., 24 A with a plug contact 25 for connection to the mains alternating voltage, specifically a mains alternating voltage of 22 volts and 50 Hz.

Instead of transformer 1, any other alternating current power supply may be connected, specifically one prone to inductance. In addition to triacs, for instance also thyristors or other semiconductor switches may be used as alternating current switch.

The second plug contact 28 connects to the circuit ground 22. The mains voltage connects by way of a unit on/off switch 27 and a line 28 to the input of synchronizing circuit 29 and a power supply 30 which on the output side makes an operating voltage $V_{cc}$ at a terminal 31 available, while a second terminal 32 connects to the circuit ground 22. The power supply 30 has a buffer capacity, so that the supply voltage $V_{cc}$ will be available still for 200 milliseconds after mains off, for supplying the electronic components of the circuit. The power supply 30 features a circuit 33 for quick mains-off recognition, which makes it possible to recognize the opening of the main switch 27 and to emit by way of a signal line 34 an off-signal, which upon opening of the control switch 27 drops from the logic level 1 to the logic level 0. Owing to the buffer capacity of 200 milliseconds upon opening of the main switch 27, the electronic components continue to be supplied with sufficient operating voltage for, e.g., 10 periods of the mains alternating voltage. Depending on the retardation of the circuits described hereafter, also a voltage supply buffered for 5 periods may be sufficient.

Following the closure of the main switch 27, the power supply makes the operating voltage available that is required by the components illustrated in the drawing, which operating voltage charges via a series resistor 35 a retardation capacitor 36. The voltage rising on the retardation capacitor 36 after turning the main switch 27 on controls an inverter 37 whose output is connected with the first input 38 of an OR gate 39. The output 40 of the OR gate 39 is connected with the reset input 41 of a flip-flop 42, causing the latter after actuation of the control switch 27 to be held by its output 43 at the logic level 0 until the voltage on the retardation capacitance 36 has reached a value, after about 0.1 seconds, that leads to the changeover of the inverter 37, on the output 43 of the flip-flop 42 there prevails thus, owing to the reset circuit described above, a zero signal, so that the firing line 44 of the optocoupler 45, connected with the output 43 of the flip-flop 42, carries no voltage; activated by the optocoupler 45, the triac 23 is thus without voltage as well and a firing of the triac 23 is safely prevented in turning the main switch 27 on.

The quick mains-off recognition 33 connects by way of the line 34 with a pnp transistor 47 which is arranged parallel to the capacitor 36. Therefore, as the main switch 27 is toggled over to off, the transistor 47 discharges the capacitor 36, making the flip-flop 42 nonconductive and thus precluding a firing of the one-off triac 23. Most of all, the retardation capacitor 36 is discharged this way and can again bring about a cut-in retardation as the main switch 27 is turned on.

As by actuation of the main switch 27 the power supply 30 is supplied with mains alternating voltage, all of the components of the circuit illustrated in the drawing, especially the synchronizing device 29, receive their operating direct voltage. The synchronizing device 29 comprises a zero pass recognition circuit 49, which on its output 50 makes at a mains frequency of 50 Hz every 10 milliseconds a zero pass pulse available. In a first half cycle recognition circuit 51, a positive signal is made available on the output 52 for each second half of each half cycle. This corresponds to a phase angle between 0° and 90° as well as between 270° and 360°, wherein the latter range may also be signified by $-90°$ to 0°.

On a second half cycle recognition circuit 53, a positive pulse is made available on its output 54, by which the negative half cycles of the mains alternating voltage are characterized. The half cycle recognition circuit 53 thus marks the phase angle range between 180° and 360° of the mains alternating voltage.

The pulses prevailing on the output 50 of the zero pass recognition circuit 39 proceed via the line 50 to the setting input 57 of a decremental counter 59 with a resolution of, e.g., 10 bits. At the occurrence of a pulse on the setting input 57, the decremental counter 58 assumes the 8-bit starting number 60 supplied through a bus 59. The bus 59 conveys the output signal of a lead angle circuit 61, which in the simplest case consists of a switch setup for selection of a hexadecimal number which is to be transferred to the decremental counter 58 as starting number. However, the lead angle circuit 60 may also be fashioned in a way such that, instead of a preset number, it will supply a computed number or one determined in conjunction with an adaptive tracking. In the simplest case, a value of $00_{Hex}$ equals an angle of 270° and a number of $FF_{Hex}$ an angle of 360°, so that a phase angle range from $-90°$ to 0° can be loaded in the decremental counter 58 as starting value before occurrence of a zero crossover.

The clock pulse input 62 of the decremental counter 58 is connected with the output 63 of an AND gate 64, the first input 65 of which carries the pulses that occur on the output 54 and are coordinated with the negative half cycles. Moreover, the second input 66 of the AND gate 64 carries the pulses 52 that characterize the second half of each half cycle.

Therefore, as soon as the mains alternating voltage has upon cut-in of the operating voltage, through closure of the main switch 27, a negative half cycle in its rising branch, that is, is contained in the angle range of $-90°$ to 0° before the rising zero pass, the AND gate 64 is opened through the lines 52 and 54 connected with the first and second inputs 65 and 66, so that the clock pulses of an encoder 68 that are present on the third input 67 can be switched to the clock pulse input 62 of the decremental counter 58. The clock pulse generator 68 is synchronized with the mains alternating voltage at rigid phase and comprises for that purpose a synchronizing input 69 which every 10 milliseconds receives from the zero pass recognition circuit 39 a pulse that lasts about 0.5 milliseconds.

The clock pulse generator 68 has a frequency of 102.40 kHz, which is so selected that the decremental counter 58, depending on the hexadecimal prevailing on the bus 59, supplies within the first half of the negative half cycle of the mains alternating voltage on its output 70 a zero pulse that is coordinated with the counter content 00.

The line 70, along with the line 71 which in the usual operation carries a logic 1 signal, is connected with the inputs of an AND gate 72, so that the zero pulse prevailing on the output 70 will be active on the setting input 73 of the flip-flop 42. Synchronous to the second half of the negative half cycle of the mains alternating voltage, the output signal on the output 43 assumes according to the adjustment lead angle circuit 60 the logic level 1, thereby causing on the firing line 44 a firing signal by which the triac 23, which can be fired by the optocoupler 45, is turned on at a phase angle between $-90°$ and 0° before the crossover of a positive zero point. Set in this fashion, the firing angle is so selected that the cut-in current peaks in the primary winding 4 of the transformer 1 are minimal and essentially correspond to the operating current peaks. Therefore, it is presumed that the transformer 1 was separated from the mains in a previous operation exactly at a phase angle of 0°, that is, at the end of a negative half cycle, and that the iron core of the transformer 2 has retained the coordinated magnetic remanence. A further prerequisite is that the transformer 1 is connected to the circuit in the same direction as in the shutoff.

If the separation of the primary winding 4 occurred at a different point in time, specifically at a phase angle of 180°, it follows from the above statements that in such a case the reconnection of the primary winding to the mains alternating current takes place at a phase angle between 90° and 180°.

Described hereafter will be those components of the circuit illustrated in the drawing which are effective in the shutoff of the transformer 1 and, thus, in the shutoff of the load.

At a shutoff of the control switch 27 at an arbitrary point in time or at a breakdown of the mains alternating voltage for external reasons, the quick mains-off recognition 33 supplies on its line 34 a 0 level signal, which generates in the inverter 74 a level 1 a signal 75 going to the input 76 of a first retardation section 77. On the inverted output 78 of the latter there occurs after, e.g., 30 milliseconds the retarded mains-off signal which proceeds to the control input 79 of a second retardation section 80. On the output 81 of the latter prevails then, for instance for a duration of 50 milliseconds, according to the aforesaid retardation of the mains-off state, a level 1 signal which through the line 82 proceeds to an optocoupler 83 that fires a setting triac or thyristor 84. The setting triac 84 is wired, in series with a current limiting resistor 85 and a storage capacitor 86, to the primary winding 4 of the transformer. The storage capacitor 86 discharges therefore via the load-limiting resistor 85 setting for the transformer 1 a predetermined remanence, so that the following cut-in of the transformer 1 starts from a predetermined state.

The storage capacitor 86 with a capacity of, e.g., 100 microfarad connects through a charging resistor 87 and a rectifying diode or through a rectifier (thyristor) controlled by the signal 75 to the mains outlet 25, and through the measuring shunt 21 to the circuit ground 22. Thus, the storage capacitor 86 will be charged even in the case when the switching triac 23 is not excited and the main switch 27 is turned off and nonconductive.

At a first turn-on of the, e.g., brand new transformer 1, the storage capacitor 86 is discharged allowing a large current to flow through the measuring shunt in the primary winding of a transformer 1. A comparator 91 measures the voltage dropping across the measuring shunt 21, computes the current flowing on the primary side and emits, for instance at a current of 30 A, a level 1 signal through an overload output line 92, which signal sets an overload flip-flop 92a. On the output line 93 of the latter prevails thus, at the occurrence of an overload current, a level 1 signal which through a protective resistor lights up a light-emitting diode 95 as an indicator light. Furthermore, the level 1 signal is present on the OR gate 39, which resets the setting flip-flop 42 making sure the triac 23 will be nonconductive at the next zero crossover of the mains voltage.

During the retardation time of the capacitor 36 and thereafter, the storage capacitor 88 is charged, which as a time section with the charging resistor 87 preferably has a time constant that is smaller than 1.5 times the period duration of the mains alternating voltage.

The circuit described here can additionally be employed, e.g., as a heating controller, owing to the enhancement described hereafter, wherein the heating power is controlled through the number of activated complete cycles as a ratio of the number of deactivated complete cycles.

The signal emitted at the synchronizing circuit 49 through the line 65 and 66 proceed to another AND gate 69 on the output 97 of which a signal prevails during the second half of a negative half cycle, i.e., in the rising branch prior to a crossover to a positive half cycle 13. This signal is converted by the R section 98 to a voltage pulse that is present on another AND gate 99. Thus, the triac 23 is made nonconductive through the OR gate 39 and the setting flip-flop 42 exactly when on the second line 100 of the AND gate 99 a level 1 signal prevails during the second half of the negative half cycle. An off-signal on the plug 102 is thus synchronized in order to properly set the remanence of the transformer 1.

A zero level signal on the line 100 leads through the inverter 101 to a level 1 signal on the line 71 making the AND gate 72 conductive in order for the decremental counter 58 to emit for the control angle a level 1 signal. Thus, a 1-signal on the plug 102 is synchronized in order to correctly turn the transformer 1 on in accordance with its remanence.

Favorably, the heating control switches the predetermined pulses to an optocoupler 105 via plug connector 102. The outputs of the optocoupler 105 are connected, for one, through a resistor 103 to the supply voltage 31 and, for another, to the circuit ground 22. The clock transmitted through the optocoupler 105 is thereby transmitted to the gates 72 and 99 so that the power supply unit 1 is turned on and off alternately at maximally one-half of the frequency of the mains alternating voltage.

This external control may be bridged by a bridge 104 so that always a zero signal according to circuit ground 22 will prevail on the line 100 and the AND gate 99 will always be nonconductive while the AND gate 72 is conductive in accordance with its second input. Thus, the power supply is turned off and on solely with the main switch 27.

FIG. 3 shows patterns of voltage signals and current signals at cut-in processes on transformers 1 in idling. Upon completion of a negative half cycle 17, the transformer 1 is shut off according to the section of curve 7 of the mains voltage. The remanence 12 is thus in a defined negative state which through the cut-in point 8 and the control angle is between $-90°$ and $0°$ so shifted in the hysteresis curve 11 that with current on the primary circuit there will no cut-in current occur that exceeds the idling current. This applies also to all other fully turned on positive and negative half cycles 13 and 17.

FIG. 4 shows the cut-in process on the transformer 1 in idling, when the mains voltage 7 is turned off upon completion of a position half cycle 13, so that in the hysteresis curve 11 the remanence 12 is set to a specific positive state. For a defined cut-in with the aid of the start-up control described in FIG. 2, with a predetermined phase angle in the negative half cycle 17, the remanence in the hysteresis curve 11 must be set to the point 12'. This is done in the circuit according to FIG. 2 by discharging the storage capacitor 88, taking place after a retardation time specified by the retardation section 77. Accordingly, the time section marked 110 reflects the retardation duration of the retardation section 77. Occurring after this time is a discharge of the capacitor 86, the charge voltage of which drops in keeping with an exponential curve 111, causing a transformer current 112 which sets the transformer 1 to a predetermined negative remanence 12'.

The curve 112 represents the transformer current which in the absence of the mains current occurs through the discharge of the capacitor 86. The transformer current 112 not being withdrawn from the mains, it is not disturbing the mains either.

FIG. 5 shows the setting of the remanence in the case of an arbitrarily or incidentally deactivated mains voltage 7. The remanence in the hysteresis curve 11 is then undefined. Along with the discharge of the capacitor 86 there occurs a discharge voltage 111 which is connected with a discharge current 112 that must be greater than the nominal current of the transformer with the transformer 1 under load, contingent on the possible load of the transformer 1, the magnitude of the capacity of the capacitor 86 is thus to be predetermined.

FIG. 5 shows the case of the defined setting of the remanence according to polarity not described in the circuit relative to FIG. 2. Here, the remanence is set positive and the phase angle, not illustrated in FIG. 5, ranges between 90° and 180°.

FIG. 6 shows signal patterns at the first-time operation of the transformer 1 with subsequent pulse operation. The mains voltage 7 is turned on at a point in time H, which may also be specified with a phase angle, wherein a large inrush 9 occurs causing the mains to be shut off after a half cycle or full cycle, with the transformer remanence in positive saturation 12. With the capacitor 86 discharging now, the remanence is set negative with a charge current 112, so that the thereafter the half cycles 13 and 17 may be turned on after any point in time desired. Illustrated in FIG. 6 is then the operation of a heating actuator which cuts in and out at a frequency of 25 Hz. This means that after a positive zero pass 115 a nearly complete full cycle will pass before the next full cycle 13 and 17 are turned on with the same angle 8. After the inrush current 9, which occurs only one time at the very first operation, and the charge current 112 which, e.g., may amount to 1 A, a cut-in current will not occur anymore, so that only the load current stresses the fuse 24.

In a device with an opposite polarity, the remanence can be set positive in a defined way with the polarity shifted 180°, and cut-in may occur with a positive phase angle before the negative half cycle. At a mains alternating voltage of 50 Hz, fast pulse sequences may be switched at a maximum clock rate of 25 Hz in the alternating current operation chosen above. FIG. 7 shows a device for cut-in current limitation in conjunction with the use of a triphase voltage supply unit 200. Identical characteristics are signified using identical reference symbols. Joining the prior characteristics in conjunction with the terminals S and N, in the R terminal, is a third alternating current switch 201 activated via an optocoupler 202 and the setting flip-flop 42. Using another measuring shunt 203, an overload current occurring on this line is detected. The signal prevailing across the measuring shunt 203 is through an optocoupler with capacitor 204 passed to an OR gate 205, in that the signal joins the overload current signal generated in the comparator 91 and proceeds to the overload flip-flop 92. The T terminal is also monitored for an excessive cut-in current; this takes place, similar to with the single phase poser supply unit, through the measuring shunt 21.

The external on-off control through the optocoupler 105 is turned off, retarded by a retardation circuit 210, when it is active as the triphase supply unit 200 is turned on. For the setting of the remanence, occurring only through a capacitor 86, allows the suppression of cut-in peaks safely only in the switched primary sides R and T of the transformer 1. The S branch remains without power. Prolonged in the cut-in, the on-signal on the line 71 assures the ebbing of cut-in current peaks in the S branch, following an exponential function, through a prolongation of the first heating cycles. The extended signal of the line 71 is through repeated inversion through the inverter 211 passed to the AND gate 99.

The retardation circuit 210 controls the mains-on signal prevailing on the line 38 for approximately 0.1 seconds. This signal sets the flip-flop 212, the output of which excites the output of the AND gate 213 and excites via the inverter 214 another input of the AND gate. Moreover, the signal 215 carried on the output of the inverter 101 is active on a third input of the AND gate 213. A level 1 signal is carried on the output of the latter thus only after completion of the mains-on signal on the line 38 and any external heating signal 215, which on-signal sets a retardation section or monoflop 216, prolonging the heating signal 215, if any, which proceeds through the OR gate 217 to the line 71, in that it prevails on another input of the OR gate 217. This first prolongation of the first heating cycles assures that small cut-in current peaks occurring in the subsequent pulse operation of, e.g., 10 Hz ebb off in the range of 2 A according to an exponential function, by premagnetization of all branches, and that they will not amplify to an inrush that would occur in an immediate, quickly repeated turning on off.

The inverted output 218 of the monoflop 216 connects through an R section 219 with the circuit ground 22. Carrying usually a zero level signal, the output 218 is for the duration of the prolonged first heating cycle a level one signal, so that the flip-flop 212 is reset after the end of the mains-on signal, after a retardation time determined by the charging time of the capacitor.

The setting of the remanence with the aid of the capacitor 36 is effective here somewhat less than with the single phase transformer, because at the first cut-in the phase angle is not exactly correct for all branches. At cut-out at the end of a negative half cycle, the remanence is then so set, defined, that the phase angle will thereafter have exactly the correct value.

I claim:

1. A device for the alternating current cut-in limitation of an inductive power supply unit wired in series with a first alternating current switch, with a phase control circuit by which the connection of the primary winding with the mains alternating voltage can be retarded from the cut-in moment on, wherein a control electrode of the first alternating current switch of the supply voltage-buffered phase control circuit is connected with the output of a control circuit by which, as the power supply unit is turned on, at a preselectable phase angle of the mains alternating voltage a firing voltage can be generated which is synchronized with it and which for the shutoff of the power supply unit can be suppressed in due time before reaching a zero pass of the mains alternating voltage, characterized in that a capacity is provided parallel to the inductive power supply unit, the capacity being arranged in series with a parallel circuit comprising a second alternating current switch and a serial arrangement of charging resistor and rectifier, in that the second alternating current switch can be fired several milliseconds after a shutoff or failure of the mains alternating voltage by a main-off recognition circuit, so that the capacity sets, in a defined way, the remanence of the power supply unit after the shutoff, in that the power supply unit may be turned on at a preselectable phase angle between 90° and 0° degrees before a zero pass of the mains alternating voltage, and in that the firing voltage of the first alternating current switch can be suppressed for the shutoff of the power supply unit, at a like type zero pass, in due time before reaching said zero pass.

2. A device according to claim 1, characterized in that the time constant of the time section formed of the capacity and the charging resistor is smaller than 1.5 times the period duration of the mains alternating voltage and/or than the main-on pulse time.

3. A device according to claim 2, characterized in that on a triphase power supply unit there is a third alternating current switch connected between a further terminal R of the power supply unit and a further terminal R of the mains voltage R, where the control electrode of the third alternating current switch connects as well with the output of the phase control circuit.

4. A device according to claim 2, characterized in that in series with the second alternating current switch there is a current limiting resistor provided.

5. A device according to claim 2, characterized in that a time section is provided which for the quick cut-in and cut-out of the power supply unit overrides the cut-in control circuit.

6. A device according to claim 2, characterized in that the control circuit features a storage element which by means of a mains-synchronized retardation circuit can be set and reset at predetermined phase angles.

7. A device according to claim 6, characterized in that the retardation circuit features a settable counter whose clock pulse input is connected with the output of a mains-synchronized clock generator.

8. A device according to claim 7, characterized in that the settable counter can be set at each zero pass of the mains alternating voltage.

9. A device according to claim 1, characterized in that on a triphase power supply unit there is a third alternating current switch connected between a further terminal R of the power supply unit and a further terminal R of the mains voltage R, where the control electrode of the third alternating current switch connects as well with the output of the phase control circuit.

10. A device according to claim 1, characterized in that in series with the second alternating current switch there is a current limiting resistor provided.

11. A device according to claim 1, characterized in that a time section is provided which for the quick cut-in and cut-out of the power supply unit overrides the cut-in control circuit.

12. A device according to claim 1, characterized in that the control circuit features a storage element which by means of a mains-synchronized retardation circuit can be set and reset at predetermined phase angles.

13. A device according to claim 12, characterized in that the retardation circuit features a settable counter whose clock pulse input is connected with the output of a mains-synchronized clock generator.

14. A device according to claim 13, characterized in that the settable counter can be set at each zero pass of the mains alternating voltage.

15. A device according to claim 12, characterized in that with the counter there is a coordinated lead angle switch for adjustment of the cut-in phase angle.

16. A device according to claim 12, characterized in that the storage element can be reset at a phase angle between 60° and 0° degrees before a zero pass.

17. A device according to claim 1, characterized in that the alternating current switches are triacs.

18. A device according to claim 3, characterized in that in series with the second alternating current switch there is a current limiting resistor provided.

19. A device according to claim 18, characterized in that a time section is provided which for the quick cut-in and cut-out of the power supply unit overrides the cut-in control circuit.

20. A device according to claim 19, characterized in that the retardation circuit features a settable counter whose clock pulse input is connected with the output of a mains-synchronized clock generator.

* * * * *

UNITED STATES PATENT AND TRADEMARK OFFICE
CERTIFICATE OF CORRECTION

PATENT NO. : 5,216,567
DATED : June 1, 1993
INVENTOR(S) : Michael Konstanzer

It is certified that error appears in the above-identified patent and that said Letters Patent is hereby corrected as shown below:

On the title page of the patent, under section [19], the inventor's last name should be changed from "Kontanzer" to --Konstanzer--.

On the title page of the patent, under section [75], the inventor's last name should be changed from "Kontanzer" to --Konstanzer--.

Signed and Sealed this

Seventh Day of June, 1994

Attest:

BRUCE LEHMAN

Attesting Officer    Commissioner of Patents and Trademarks